Dec. 15, 1925.

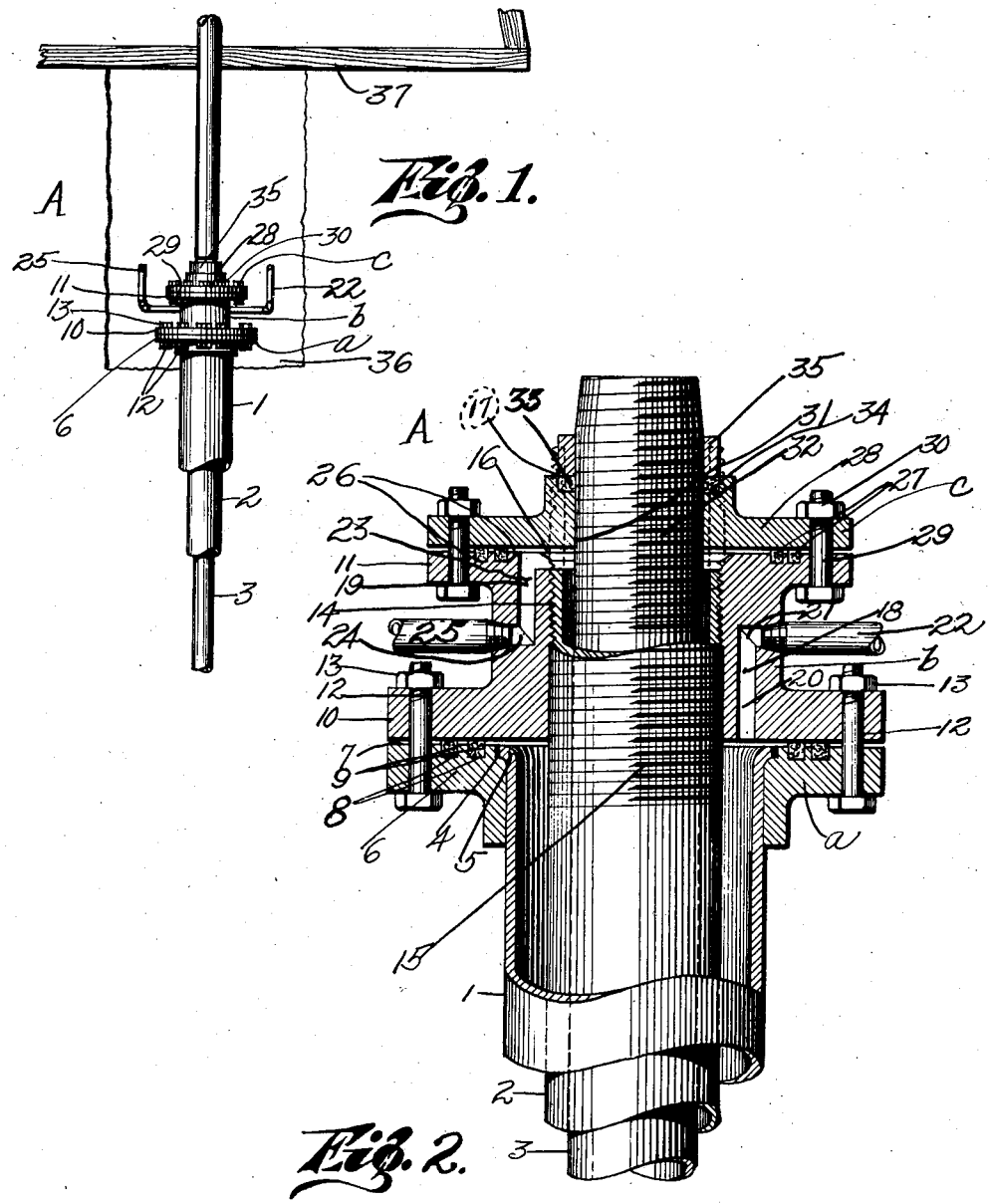

W. A. TROUT ET AL 1,566,256

CASING CLAMP

Filed April 11, 1922    2 Sheets-Sheet 2

William A. Trout & Charles R. Butler, INVENTORS

BY Raymond Lee Blakeslee, ATTORNEY

Patented Dec. 15, 1925.

1,566,256

UNITED STATES PATENT OFFICE.

WILLIAM A. TROUT AND CHARLES R. BUTLER, OF LONG BEACH, CALIFORNIA, ASSIGNORS OF ONE-THIRD TO CHESTER A. RASMUSSEN, OF LONG BEACH, CALIFORNIA.

CASING CLAMP.

Application filed April 11, 1922. Serial No. 551,465.

*To all whom it may concern:*

Be it known that we, WILLIAM A. TROUT and CHARLES R. BUTLER, citizens of the United States, residing at Long Beach, in the county of Los Angeles and State of California, have jointly invented new and useful Improvements in Casing Clamps, of which the following is a specification.

This invention relates to casing clamps, and has for an object the provision of a casing clamp adapted in and of itself to hold strings of casing in position and likewise to prevent any gas blow-outs through said casing clamps.

It is a well known fact that the average casing clamp now used in oil well practice is inefficient in many ways for the purpose and work required of it. Particularly, casing clamps are used for holding concentric sections of casing, and the casing clamp usually comprises a split ring, the inner surface of which is grooved and carries a packing or gasket. The outer surface of one side may carry an annular gasket. One section of casing will carry a collar member. A second casing surrounds the first casing and carries a collar member which abuts against the outside gasket, while the collar of the concentric inner casing bears on the top surface of the clamp. It will thus be seen that the weight of the inner casing holds the casing clamp in position so that the gasket member engages the collar on the second casing. If a string of casing is provided other collars of course must be provided with additional casing clamps and the casing clamps are held in position by the weight of the casing members. The last casing of course helps sustain the weight of the remaining casing, and it often happens that if the gas pressure in the annular space between any two casing members becomes excessive the pressure of gas will lift one of said casings upwardly and cause gas to leak past the gasket, with the result that the casing is often lifted entirely from the well hole and deposited in a field, or a disastrous blow-out occurs necessitating a very expensive fishing expedition. This method of joining casings by the casing clamps now generally used, connects the various strings of casing at distances, with the consequence that gas only has to leak from one of the casings past the gasket to discharge itself. Obviously, the gas flowing under a velocity sufficient to lift the casing, carries with it fine particles of sand and the sand rapidly cuts its way through the gaskets and the casing. Fires result and it is often necessary to spend months fishing for the remaining casing which has dropped within a well hole, in order to properly cement off the various strata of earth in compliance with the law requiring that the oil be separated from water. It is thus obvious that this "stepped" method of joining casing by a series of collars at spaced intervals, is unsatisfactory and that means other than the weight of the casing should be employed.

Our present invention is three-fold in its adaptation in usefulness, in that it first connects up all the concentric strings of casing, and second, the clamps are independent of the casing, so far as the gasket members are concerned, the casing itself, whether it is lifted or not by gas pressure, not causing any leakage through the casing clamps; and lastly, in case of a blow-out from one casing to another, it is necessary from the very method of coupling the various casings to blow out the entire series of casings, which is practically impossible in actual practice.

The invention has for further objects the provision of improved casing clamps which will be superior in point of relative simplicity and inexpensiveness, taken in conjunction with utility, durability and general efficiency and serviceability.

With the above mentioned and other objects in view, the invention consists in the novel and useful provision, formation, construction, combination, association and inter-relation of parts, members and features, as illustrated in some of its embodiments in the accompanying drawings, described in the following detailed statement, and finally pointed out in the claims.

In the drawings:

Figure 1 is a fragmentary view illustrating our improved clamp holding strings of casing;

Figure 2 is a fragmentary view, parts being in section, of one adaptation of our clamp;

Corresponding parts in all the figures are designated by the same reference characters.

Figure 3:
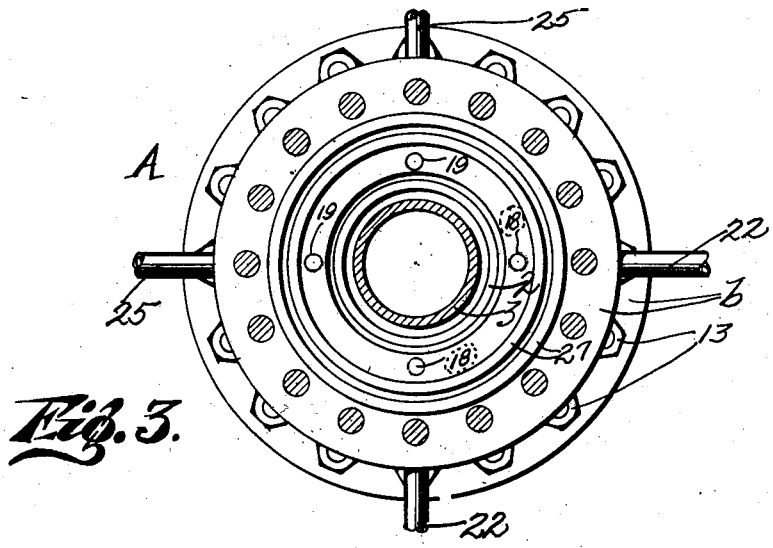
Figure 3 is a fragmentary top plan view of the clamp shown in Figure 2.

Referring with particularity to the drawings, A designates in its entirety and one embodiment, the improved casing clamp. In the adaptation of said clamp shown in Figures 1 to 3 inclusive, it is to be noted that the said clamp is holding three strings of casing, namely, 1, 2 and 3, respectively. The clamp A for holding three strings of casing includes a flanged base ring member $a$ and an intermediate ported spool-like suspension member $b$, and a cap or top flanged ring member $c$. The member $a$ is annular in formation, and provided at its mouth with an off-set annular or stepped portion providing a casing seat 4, the casing 1 being flared outwardly or belled, as shown at 5 for reception in the seat 4. The flanged portion 6 of the member $a$ is provided on a face thereof as at 7, with one or more concentric annular grooves 8, within which grooves are received annular glands, washers or gaskets 9, said members 9 projecting from the face 7. Adapted to be carried and supported upon the flange 6 of the member $a$, and particularly upon the gasket members 9, is the member $b$, termed the spool member. This member $b$ is annular in formation and provided with top and bottom spaced annular flanges 10 and 11. The flange 10 is provided with a plurality of transverse perforations adapted to be aligned with transverse spaced perforations carried in the flanged portion of the member $a$; and bolt members 12 are passed through said aligned perforations for the purpose of holding the members $a$ and $b$ in cooperative relation, nuts 13 carried by the bolts being provided for effecting such cooperative locking relation. The inner surface of the spool member $b$ is provided with screw threads 14, and the casing 2 extends upwardly through the casing 1 and is screw-threaded exteriorly, as at 15, for engagement with the screw-threaded portions 14 in the spool member $b$. One of the essential features of the present casing clamp and its association with casings, resides in the fact that the casing is screw-threaded exteriorly for long distances, which screw-threaded portions are adapted to coact as stated, with the casing clamp, and specifically the threaded portions thereof. That is to say, the tubing or casing member which operates in the zone of the mouth of the outer shell or casing is provided with a threaded section of sufficient extent to permit of the normal take-up of normal slack in the string of tubing to which said member is attached. This upper tubing or casing member may be the topmost section of the string of tubing or may be a specially provided short section or "nipple" screw-threaded exteriorly substantially throughout its length. In Figure 2 it will be noted that the casing 2 extends upwardly within the spool $b$ to a point as 16, whereupon the casing may be cut off or extended, as shown by the dotted line at 17. The spool $b$ is provided with internal bores 18 and 19, the bores 18 having a portion 20 adapted to communicate with the annular space between the casings 1 and 2, and with a portion 21 communicating outwardly from said spool. The wall 21 of the portion is provided with screw threads for reception of the screw threaded end of a pipe or pipes 22. The bore 19 likewise includes two portions as 23 and 24, the portion 24 being screw-threaded for reception of the threaded end of a pipe 25, and the portion 23 of the bore 19 is in communication with the annular space included between the casings 2 and 3; it will thus be seen that we have a bore 18 and 19, or a series of said bores having points of communication through sides of the spool $b$ and with faces of the flanged portions 10 and 11. The spool member $b$ and particularly the flange 11 is provided with one or more concentric annular grooves 26, which grooves receive and carry gaskets, washers or packings 27. As in the case of the gaskets 9, the gaskets 27 extend upwardly from the face of the flange 11. The cap flange member $c$ is adapted to have a flange 28 thereof rest upon the gaskets 27, and the flange 11 of the member $b$ and the flange 28 are each provided with a plurality of transverse spaced perforations adapted to be aligned for reception of bolts 29, whereby the members $b$ and $c$ may be secured together when nuts 30 are screw-threaded upon the bolts and tightened. The member $c$, which like the members $a$ and $b$, is annular in formation, has its inner surface screw-threaded as at 31 for reception of the exterior threaded portion 32 of the casing 3. In Figure 2 a gland 33 is carried in an annular recessed portion 34 of the member $c$ and a collar member 35 screw-threaded upon the casing 3, bears downwardly upon said gland 33. An analysis of the device disclosed in Figure 2 and as it is described, will reveal the fact that the casings 1, 2 and 3 are united to one casing clamp, and that the said casings are held in concentric relation terminating within said clamp A or the elements thereof, and that not a single casing depends upon resisting gas blow-outs by its weight alone upon a gasket member. It is obvious that in order to cause a gas blow-out in the string, as shown in Figures 1 and 2, assuming that the gas could not escape as between the flanges of the members $a$ and $b$, $b$ and $c$, because of the gasket members, it would be impossible for the gas to escape, for the reason that the gas would have to break through practically two casing walls providing the gas pressure came from between the casings 2 and 3. Obviously the greatest gas pressure occurs between the smaller casings, as the smaller casings are further down in the well hole. The pipes 22 and 25 conduct the accumulated gas from between the casings, and the gas may be regulated as to its flow so as to keep it harnessed within certain limits. In Figure 1 the casing clamp A is shown within a cellar 36 beneath the derrick floor 37 of an oil well rig, and it is customary to cement in the casing 1. By bringing each casing up to a common point for attachment with a casing clamp, such as that just described, it will be seen that all operations on said casing may be conducted from a common zone, whereas in the system now used the zones are widely separated with no assurance whatever, as has been pointed out, of preventing gas blow-outs. It is obvious upon inspection of the drawings that if the casing 3 were not used, the spool member b and the member a might be used alone, or in case more than three casings were used, another spool member might be placed on top of the spool member b, the second spool member being smaller than the spool b, but of identical formation. The second spool member of course would take care of two more strings of casing and the second spool member might be capped with a member c. Thus any number of strings of casing may be accommodated within a small zone, and this construction renders the casing easy to handle and facilitates operations with respect to repair or otherwise.

Figure 4:
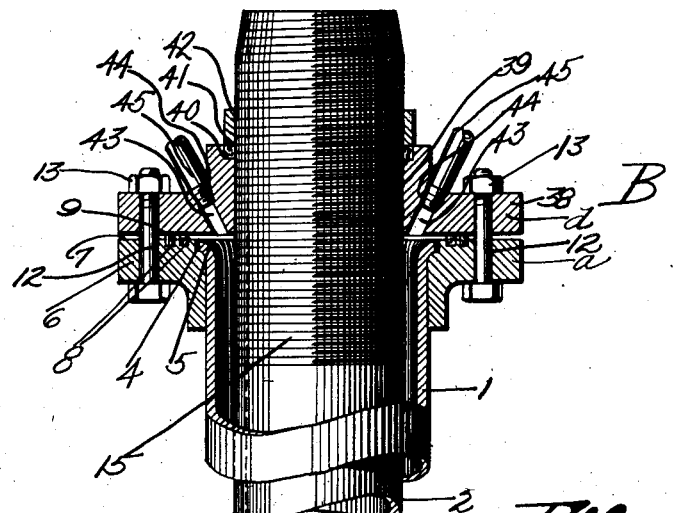
Figure 4 is a fragmentary view, certain parts being in section, of a modified form of the casing clamp.

In Figure 4 we have illustrated one adaptation of the casing clamp which we designate as B, and said clamp includes the flange a carrying the casing 1, with a second member d having a flanged portion 38 provided with a plurality of spaced transverse perforations for alignment with the perforations in the member a with bolts 12 as before mentioned, passing through said perforations for securing the members a and d together. The member d is of course annular in formation and the inner annular surface is screw-threaded at 39 for reception of the threaded portion of the tubing 2. The member d is annularly recessed, as shown at 40 for reception of a gasket 41, with a threaded collar 42 screw-threaded upon said casing 2 and bearing against the gasket 41. The member d is likewise provided with a plurality of ports 43 extending therethrough with a wall portion surrounding said ports screw-threaded as at 44 for reception of the screw-threaded ends or pipes 45. The ports communicate with the annular space included between the casings 1 and 2 with a point exterior the casings. This construction does not differ essentially in its broad aspect from the casing clamp illustrated by A, and in fact, the port openings 18 and 19 might be inset on an angle instead of in the form shown. The pipes 45 of course lead either to a gas pressure gauge or to a tank or both, as was the case of the pipes 22 and 25.

It is preferable to weld the belled mouth of the casing 1 to the member a, as this will ensure a close working fit as between said members.

The operation of the device is substantially as follows:

The well casing 1 is placed in the well in the usual manner and then the flanged base ring a is suitably connected to the well casing at the mouth thereof. The interior strings of tubing are then placed in the casing 1, and, for purposes of illustration it will be assumed that the string of tubing 2 is next to be put in place with the aid of the usual elevator on the ground level. This string of tubing 2 consists of tube sections of suitable length connected by couplings and when the length of tubing reaches the bottom of the well it rests on the earth formation at the bottom where it may be suitably anchored in any well known manner. The next step involves the connecting of the upper end of the tubing to the clamp, and in order to do that the usual elevator must temporarily release the string of tubing which is usually thousands of feet long, and in so doing the inherent flexibility of the tubing will cause the same to buckle or bend in the casing 1 in the well known manner. Before permanently anchoring the upper end of the tubing, however, it is necessary to remove the slack which manifests itself in the bending or lateral warping of the tubing under its weight in the casing, and in order to do that the tubing must be against lifted to take out the slack. However, before the tubing is again placed in the elevator to be lifted to remove the slack, the flanged member b is placed on the relatively long threaded portion 15 of the member 2 which may be the upper section of the tubing or a special threaded section used for that purpose. After the member b is placed on the upper end of the tubing the same is then lifted by the usual elevating means until all of the slack is removed and then the member b is rotated on the threads 15 until the flange 10 of the member b comes into engagement and rests on the packing carried by the flange 6 of the member a. When the flange 10 rests on the flange 6 the entire string of tubing 2 will be supported, without slack, on the fastening base formed by the flanged member a. When the string of tubing 2 has been properly suspended in the well casing, any portion projecting above the member a may be cut off if desired to permit the application of additional tubing suspending members to enable tubing strings of smaller diameter to be inserted within the string previously set up.

From the foregoing description of the operation and installation of the device it will be apparent that the flanged base ring $a$ constitutes a fastening base at the top of the outer casing section which supports the superposed interior tubing suspending members $b$, $c$, etc.

Also it may be pointed out that the flanged base ring $a$ which may be connected to the flange of a superposed tube suspending member $b$ or its equivalent, is connected by bolts or suitable fastenings whereby it is possible to insert one fastening in position with the upper member out of registry with the lower member $a$, whereby the single fastening may act as a pivot to swing both sections into line to permit them being substantially connected with a plurality of fastenings. This construction is of particular advantage when a well is "flowing" because under those circumstances it would be practically impossible to place a screw-threaded connection in the top of the casing member. With the present construction, however, a "flowing" well may be readily controlled in an efficient and expeditious manner.

It is obvious that many changes, modifications and variations may be made in departure from the particular description as given, all of said modifications being made, however, within a fair interpretation of the invention as defined by the scope of the appended claims.

Having thus disclosed our invention, we claim and desire to secure by Letters Patent:

1. A casing clamp including in combination, a flanged base ring adapted to surround a casing member, a spool-like tubing suspension member having an interior bore of less diameter than the diameter of the casing member carried by the flanged base ring, and said bore being threaded thereby to adjustably receive a threaded tubing section, a flanged cap ring having an interior bore of less diameter than the interior bore of the spool-like member and also being threaded thereby to receive a tubing section, and said spool-like member having passages providing communication between the upper face of the spool-like member and the outer side thereof and also providing communication between the lower face of said member and the outside thereof, whereby in each instance to establish communication with different spaces between the concentric tubing and casing sections.

2. A well construction including the outer casing having at the top a fastening base, a string of tubing extending into the casing and provided at the top with a threaded portion of greater extent than the extent of the normal take up in the slack in the string of tubing, and a supporting member having an adjustable play on said threaded section of the tubing corresponding to the extent of the slack to be taken up therein and adapted, when the slack is removed from the tubing, to be rigidly secured to said fastening base.

3. In a casing clamp, the combination with a well casing, of a flanged supporting member secured to the mouth thereof, of a superposed flanged member having an interiorly threaded bore and an adjustable tubing section having exterior threads engaging with the interiorly threaded portion of said flange member and adapted to be coupled at its lower end to the tubing string whereby the end of said adjustable section may be lifted to pull the slack out of the tubing with which it is connected, whereupon the flanged member may be screwed down into contact with said flanged member on the well casing.

4. A well construction for removing the slack from strings of tubing and supporting the same including a member connected with an outer string of tubing, a superposed member having an interior bore provided with threads, means for forming a gas tight joint between the abutting faces of the superposed members, an interior string of tubing having a top section provided with a long externally threaded portion whereby the superposed member having the interior threaded portion may adjustably engage said long threaded portion of the tubing section thereby to be screwed downwardly thereon for a distance corresponding to the amount of slack removed from the string of tubing, thereby to permit said superposed member to come into abutting relation with the tubing engaging member therebeneath.

5. A well construction for supporting a plurality of concentric tubing strings including superposed tubing suspension members the upper one of said members having offset fastening receiving elements at its top and bottom edges and also provided with an eternally threaded bore, a tubing string including a top member having external threads for engaging with the internally threaded bore of the said upper suspension member, whereby the suspension member may be adjusted with reference to the tubing to maintain the same in a set position with reference to the adjoining suspension member therebeneath, means for fastening the offset portions of adjacent tubing suspension members together, and means for forming a gas tight joint between the abutting faces of said suspension members.

6. A well construction for supporting a plurality of concentric tubes comprising a flanged base member engaging with the outer casing, a plurality of superposed externally flanged tubing suspension members each having an internally threaded bore of smaller diameter than the adjacent member below, means for connecting the externally projecting flanges of said tubing suspension members, means for forming a gas tight joint between the flanges of adjoining suspension members, and tubing strings having externally threaded portions connected with the internally threaded suspension members.

7. A well construction including in combination with the well casing, a supporting member located at the top of the casing, a spool-like tubing suspension member having an interior bore of less diameter than the diameter of the casing and said bore being threaded thereby to provide a threaded connection from which is suspended a tubing section, a flanged cap ring having an interior bore of less diameter than the interior bore of the spool-like member and also interiorly threaded thereby to provide a threaded connection for suspending therefrom another tubing section.

8. A well construction including in combination with the well casing, a supporting member located at the top of the casing, a spool-like tubing suspension member having gas venting means and an interior bore of less diameter than the diameter of the casing and said bore being threaded thereby to provide a threaded connection from which is suspended a tubing section, a flanged cap ring having an interior bore of less diameter than the interior bore of the spool-like member and also interiorly threaded thereby to provide a threaded connection for suspending therefrom another tubing section.

9. A well construction including in combination with the well casing, a base member at the mouth of said casing, and a plurality of tubing suspension members disposed in contacting relation one upon the other and having a gas tight packing therebetween, said suspension members having outwardly offset portions adapted to be connected with a similar portion of an adjacent suspension member, and each of said suspension members having a central opening of less diameter than the member therebeneath and provided with threads to receive a threaded part of the tubing adapted to be connected therewith.

In testimony whereof, we have signed our names to this specification.

WILLIAM A. TROUT.
CHAS. R. BUTLER.